(12) United States Patent
Oswal et al.

(10) Patent No.: US 10,476,784 B2
(45) Date of Patent: Nov. 12, 2019

(54) UNDERLAY OVERLAY CORRELATION FOR VISIBILITY AND DEBUGGING

(71) Applicant: Cisco Technology, Inc., San Jose, CA (US)

(72) Inventors: Anand Oswal, Pleasanton, CA (US); Muninder Sambi, Fremont, CA (US); Sanjay Kumar Hooda, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 157 days.

(21) Appl. No.: 15/263,405

(22) Filed: Sep. 13, 2016

(65) Prior Publication Data

US 2018/0077055 A1    Mar. 15, 2018

(51) Int. Cl.
*H04L 12/721* (2013.01)
*H04L 12/743* (2013.01)
*H04L 12/715* (2013.01)
*H04L 12/46* (2006.01)
*H04L 12/933* (2013.01)

(52) U.S. Cl.
CPC .......... *H04L 45/38* (2013.01); *H04L 12/4633* (2013.01); *H04L 45/64* (2013.01); *H04L 45/7453* (2013.01); *H04L 49/10* (2013.01)

(58) Field of Classification Search
CPC ..... H04L 45/38; H04L 45/7453; H04L 45/64; H04L 12/4633
See application file for complete search history.

(56) References Cited

U.S. PATENT DOCUMENTS

| | | | | |
|---|---|---|---|---|
| 2013/0003736 | A1* | 1/2013 | Szyszko | H04L 47/2441 370/392 |
| 2013/0201989 | A1* | 8/2013 | Hu | H04L 45/24 370/392 |
| 2014/0325649 | A1* | 10/2014 | Zhang | H04L 43/024 726/23 |
| 2015/0009995 | A1* | 1/2015 | Gross, IV | H04L 45/74 370/392 |
| 2016/0261492 | A1* | 9/2016 | Xiao | H04L 41/0686 |
| 2016/0315823 | A1* | 10/2016 | Flores | G06Q 10/0639 |
| 2016/0359728 | A1* | 12/2016 | Ficara | H04L 45/14 |

* cited by examiner

*Primary Examiner* — Albert T Chou
(74) *Attorney, Agent, or Firm* — Merchant & Gould P.C.

(57) ABSTRACT

A network device may receive a flow having source information corresponding to a first client device and destination information corresponding to a second client device. A tag may then be created by the network device for the flow based upon the source information and the destination information. Next, the network device may encapsulate a packet corresponding to the flow. The packet may be encapsulated with encapsulation information including the created tag. The encapsulated packet may then be routed through a plurality of intermediate network devices in the network. The created tag encapsulated with the packet may identify the packet as being a part of the flow as the packet is routed through the plurality of intermediate network devices.

15 Claims, 3 Drawing Sheets

UNDERLAY OVERLAY CORRELATION FOR VISIBILITY AND DEBUGGING

TECHNICAL FIELD

The present disclosure relates generally to correlating flows in an overlay network.

BACKGROUND

A computer network or data network is a telecommunications network that allows computers to exchange data. In computer networks, networked computing devices exchange data with each other using a data link. The connections between nodes are established using either cable media or wireless media. The best-known computer network is the Internet.

Network computer devices that originate, route, and terminate the data are called network nodes. Nodes can include hosts such as personal computers, phones, servers as well as networking hardware. Two such devices can be said to be networked together when one device is able to exchange information with the other device, whether or not they have a direct connection to each other. Computer networks differ in the transmission medium used to carry their signals, the communications protocols to organize network traffic, the network's size, topology, and organizational intent.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
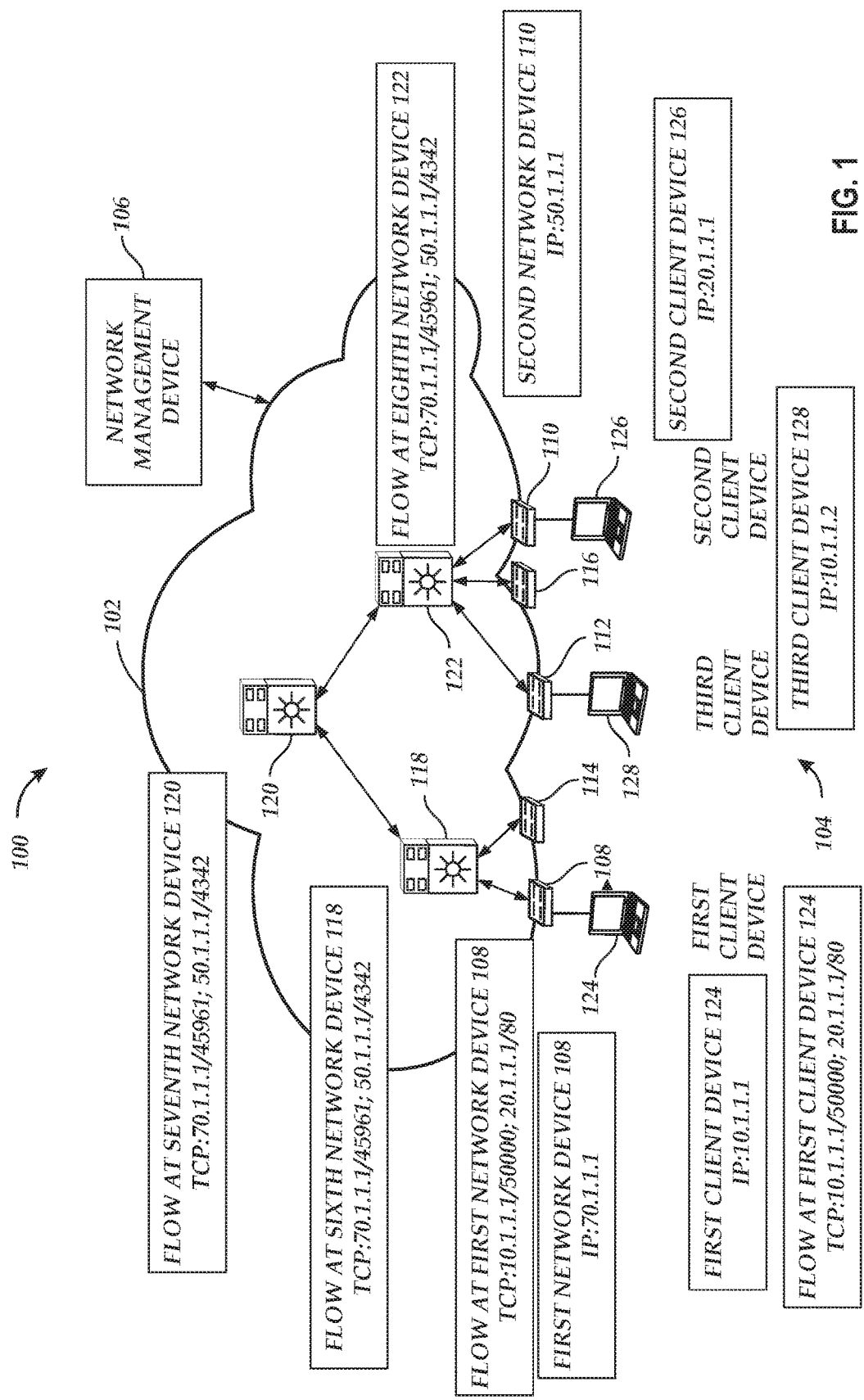
FIG. 1 shows a system for providing underlay overlay correlation in a network.

A network device may receive a flow having source information corresponding to a first client device and destination information corresponding to a second client device. A tag may then be created by the network device for the flow based upon the source information and the destination information. Next, the network device may encapsulate a packet corresponding to the flow. The packet may be encapsulated with encapsulation information including the created tag. The encapsulated packet may then be routed through a plurality of intermediate network devices in the network. The created tag encapsulated with the packet may identify the packet as being a part of the flow as the packet is routed through the plurality of intermediate network devices.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A fabric network is a network topology in which components pass data to each other through interconnecting network switches. Network nodes, in the fabric network, interconnect via one or more of the interconnecting network switches. One problem with fabric networks is the loss of visibility onto an inner packet in the intermediate nodes (i.e., network devices) of the fabric network. Because of this loss of visibility onto the inner packet in the intermediate nodes, a conventional collector/analyzer, for example, may not be able to correlate between flows that are coming from fabric edge nodes with the intermediate nodes thus losing visibility into the network when overlays are present. Embodiments of the disclosure may use information that was utilized to generate a tag (e.g., a hash) and correlate it with a source port of the overlay flows as described below. Embodiments of the disclosure may correlate the flows in overlay networks with the underlying flows by using, for example, the hash function used to create a source port (i.e., Src port) in the overlay networks thus helping with visibility and troubleshooting in such networks.

FIG. 1 shows a system 100 consistent with embodiments of the disclosure for providing underlay overlay correlation. As shown in FIG. 1, system 100 may comprise a network 102, a plurality of client devices 104, and a network management device 106. Network 102 may comprise a first network device 108, a second network device 110, a third network device 112, a fourth network device 114, a fifth network device 116, a sixth network device 118, a seventh network device 120, and an eighth network device 122. Plurality of client devices 104 may comprise a first client device 124, a second client device 126, and a third client device 128. The network devices in network 102 may comprise, but are not limited to, switches and routers for example. Network 102 may comprise any number of network devices. Plurality of client devices 104 may comprise any number of client devices and is not limited to three. Each of plurality of client devices 104 may comprise any type device that may communicate over network 102. For example, each of plurality of client devices 104 may comprise, but are not limited to, a Wi-Fi access point, a cellular base station, a tablet device, a mobile device, a smart phone, a telephone, a remote control device, a set-top box, a digital video recorder, a cable modem, a personal computer, a network computer, a mainframe, a router, or other similar microcomputer-based device.

Network 102 may comprise a fabric network. The fabric network may comprise an underlay and an overlay. The underlay may deal with connectivity between fabric elements (e.g., network devices) and the overlay may deal with user traffic entering the fabric. Traffic may enter the fabric network (i.e., network 102) through fabric edge nodes (e.g., first network device 108, second network device 110, third network device 112, fourth network device 114, and fifth network device 116). The traffic may be routed through network 102 via a plurality of intermediate nodes (i.e., network devices) comprising, for example, sixth network device 118, seventh network device 120, and eighth network device 122. The fabric edge nodes may be responsible for encapsulating a packet with a fabric header that contains an egress fabric edge node address. When a packet (e.g., frame) arrives at the egress fabric edge node, a fabric header may be stripped off and the native packet may be forwarded according to an inner address. The fabric network may be capable of providing layer-2 and layer-3 services on top of the underlay. The fabric network may have end-points (e.g., plurality of client devices 104) connected to it.

Consistent with embodiments of the disclosure, a control plane (e.g., in the overlay of the fabric network) of network 102 may track the location of endpoints (i.e., hosts connected to the fabric network). The end endpoints tracked by the control plane may comprise first client device 124, second client device 126, and third client device 128. First client device 124, second client device 126, and third client device 128 may each have an identifier, for example, a media access control (MAC) address, an internet protocol (IP) (e.g., IPv4 or IPv6) address, or any other identifier for the client device connected to the fabric network. First client device 124 (e.g., with IP address 10.1.1.1) may be behind first network device 108, second client device 126 (e.g., with IP address 20.1.1.1) may be behind second network device 110, and third client device 128 (e.g., with IP address 10.1.1.2) may be behind third network device 112. First client device 124 may be connected to port 50000 of first network device 108 that may have IP address 70.1.1.1. Second client device 126 may be connected to port 80 of second network device 110 that may have IP address 50.1.1.1.

Network management device 106 may comprise a collector/analyzer and may collect IP traffic information and monitor the traffic on network 102. By analyzing flow data, network management device 106 may create a view of network traffic flow and volume. Network management device 106 may provide the ability to collect IP network traffic as it enters or exits an interface (e.g., first network device 108, second network device 110, third network device 112, fourth network device 114, fifth network device 116, sixth network device 118, seventh network device 120, and eighth network device 122). By analyzing the data provided, a network administrator may determine, for example, the source and destination of traffic, class of service, and the causes of congestion. Consistent with embodiments of the disclosure, network management device 106 may correlate flows in network 102 without stripping traffic down to its inner packets.

Figure 2:
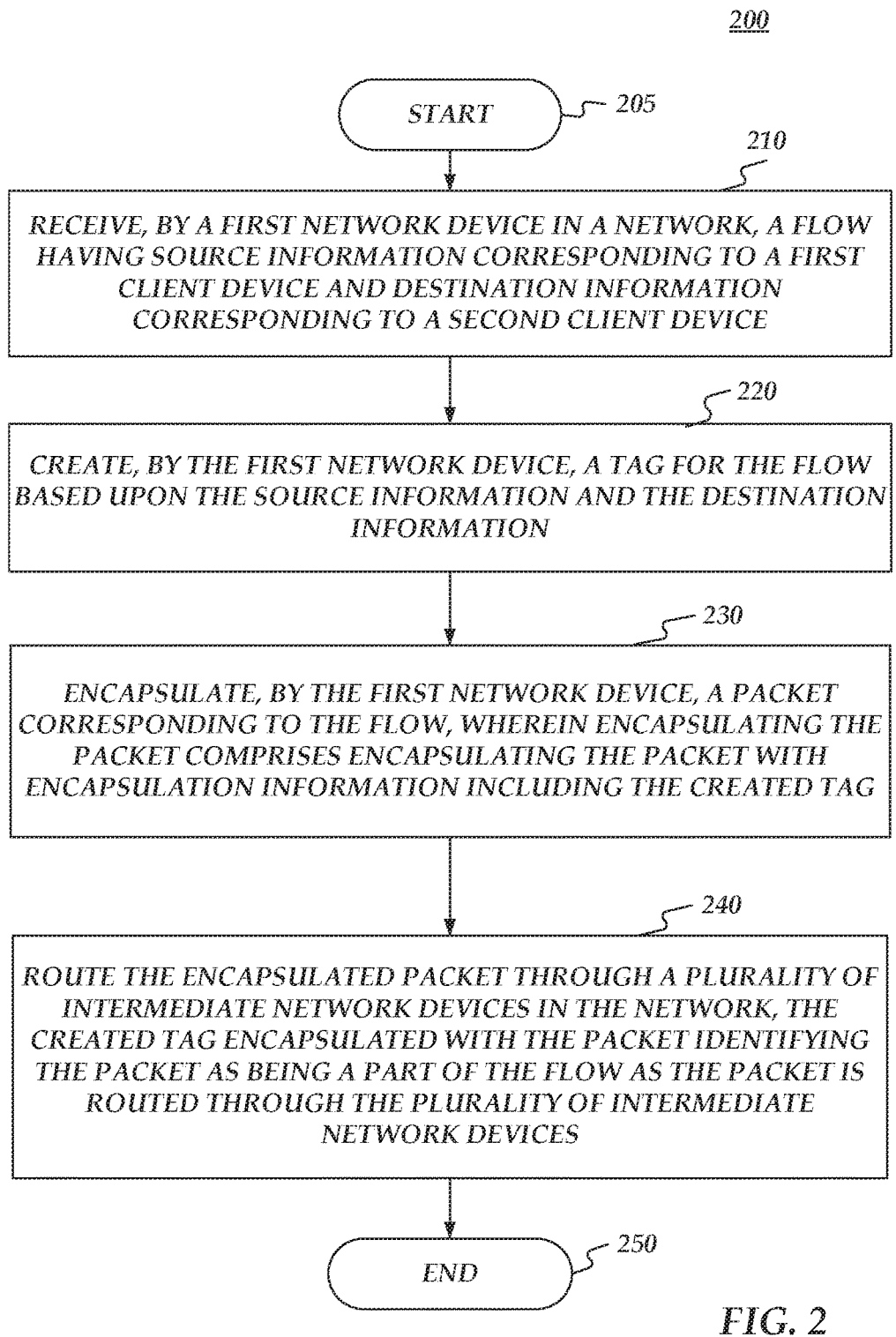
FIG. 2 is a flow chart of a method for providing underlay overlay correlation in a network.

FIG. 2 is a flow chart setting forth the general stages involved in a method 200 consistent with an embodiment of the disclosure for providing underlay overlay correlation in a network. Method 200 may be implemented using first network device 108 as described in more detail above with respect to FIG. 1. Implementations of method 200 will be described in greater detail below.

Method 200 may begin at starting block 205 and proceed to stage 210 where first network device 108 may receive a flow having source information corresponding to first client device 124 and destination information corresponding to second client device 126. For example, the flow may be between first client device 124 and second client device 126. Table 1 shows the first client device 124 to second client device 126 connection. For example, the flow at first client device 124 may be described as {TCP:10.1.1.1/50000; 20.1.1.1/80}. When this flow reaches first network device 108, first network device 108 may have the same flow entry as Table 1. First network device 108 may exports this flow entry to network management device 106.

TABLE 1

| Protocol | SrcIP | Src port | DstIP | Dst port |
|---|---|---|---|---|
| TCP | 10.1.1.1 | 50000 | 20.1.1.1 | 80 |

The source information corresponding to first client device 124 may comprise a source address corresponding to first client device 124 and a source port identifier corresponding to first client device 124. The source address may comprise the internet protocol address of first client device 124 and the source port identifier may be for a port on first network device 108 that first client device 124 is connected. As shown in Table 1, the source address (e.g., SrcIP) corresponding to first client device 124 may comprise 10.1.1.1 and the source port identifier (e.g., Src port) corresponding to first client device 124 may comprise 50000 (because first client device 124 may be connected to port 50000 on first network device 108). The source address corresponding to first client device 124 may not be limited to an internet protocol (e.g., IPv4 or IPv6) address and may comprise a media access control (MAC) address or any other identifier for first client device 124 connected to network 102.

The destination information corresponding to second client device 126 may comprise a destination address corresponding to second client device 126 and a destination port identifier corresponding to second client device 126. The destination address may comprise the internet protocol address of second client device 126 and the destination port identifier may be for a port on second network device 110 that second client device 126 is connected. As shown in Table 1, the destination address (e.g., DstIP) corresponding to second client device 126 may comprise 20.1.1.1 and the destination port identifier (e.g., Dst port) corresponding to second client device 126 may comprise 80 (because second client device 126 may be connected to port 80 on second network device 110). The destination address corresponding to second client device 126 may not be limited to an internet protocol (e.g., IPv4 or IPv6) address and may comprise a MAC address or any other identifier for second client device 126 connected to network 102.

From stage 210, where first network device 108 received the flow having source information corresponding to first client device 124 and destination information corresponding to second client device 126, method 200 may advance to stage 220 where first network device 108 may create a tag for the flow based upon the source information and the destination information. For example, first network device 108 may take parameters in the flow and process the parameters through a hash function to get a hash for the flow. The tag, for example, may comprise the hash. The parameters may comprise the source information corresponding to the sending end of the flow (e.g., first client device 124) and destination information corresponding to the receiving end of the flow (e.g., second client device 126).

The source information corresponding to the sending end of the flow may comprise: i) the source address (e.g., IP address) corresponding to the client device sending the flow (e.g., first client device 124); and ii) the source port identifier corresponding to the client device sending the flow (e.g., first client device 124). The destination information corresponding to the receiving end of the flow may comprise: i) the destination address (e.g., IP address) corresponding to the client device receiving the flow (e.g., second client device 126); and ii) the destination port identifier corresponding to the client device receiving the flow (e.g., second client device 126). Using the example shown in Table 1, the hash function may be used on {TCP,10.1.1.1, 50000, 20.1.1.1, 80} to get a hash for the flow. This hash may comprise, for example, 45961.

Once first network device 108 creates the tag for the flow based upon the source information and the destination information in stage 220, method 200 may continue to stage 230 where first network device 108 may encapsulate a packet corresponding to the flow. Encapsulating the packet may comprise encapsulating the packet with encapsulation information including the created tag. For example, first network device 108 may encapsulate the packet in the fabric network encapsulation with encapsulation information comprising: i) an address (e.g., IP address) of first network device 108 (to which first client device 124 is connected), the created tag, an address (e.g., IP address) of second network device 110 (to which second client device 126) is connected, and an overlay port identifier. As discussed above, the created tag may comprise a hash from the original packet.

After first network device 108 encapsulates the packet corresponding to the flow in stage 230, method 200 may proceed to stage 240 where first network device 108 may route the encapsulated packet through a plurality of intermediate network devices in network 102. The plurality of intermediate network devices may comprise, but are not limited to, sixth network device 118, seventh network device 120, and eighth network device 122. The created tag encapsulated with the packet may identify the packet as being a part of the flow as the packet is routed through the plurality of intermediate network devices. For example, as the plurality of intermediate network devices receive this packet, they may have a flow entry as shown in Table 2. As shown in Table 2, SrcIP may comprise the IP address of first network device 108 (to which first client device 124 is connected), Src port may comprise the created tag, DstIP may comprise the IP address of second network device 110 (to which second client device 126) is connected, and Dst port may comprise an overlay port identifier.

TABLE 2

| Protocol | SrcIP | Src port | DstIP | Dst port |
| --- | --- | --- | --- | --- |
| TCP | 70.1.1.1 | 45961 | 50.1.1.1 | 4342 |

The flow entry shown in Table 2 may be exported by the plurality of intermediate network devices to network management device 106. Accordingly, the tag (e.g., Src port) may be used to identify the flow. When network management device 106 receives a flow from leaf nodes in network 102, it may use the same hash function as used by fabric edge nodes (e.g., first network device 108, second network device 110, third network device 112, fourth network device 114, and fifth network device 116) and may generate the same hash. When network management device 106 receives flow information from the plurality of intermediate network devices (e.g., intermediate nodes), it may check the source port of the flows and may match with flows from the fabric edge nodes thus providing correlation. Accordingly, embodiments of the disclosure may provide visibility and analytics in fabric deployment (in general any overlay deployment) that may not need any hardware and software upgrades on the plurality of intermediate network devices. Furthermore, to improve the correlation, network management device 106 may communicate with the control plane of network 102 to determine how, for example, first client device 124 and second client device 126 are connected. This may reduce the number of collision and false correlation. Once first network device 108 routes the encapsulated packet in stage 240, method 200 may then end at stage 250.

Figure 3:
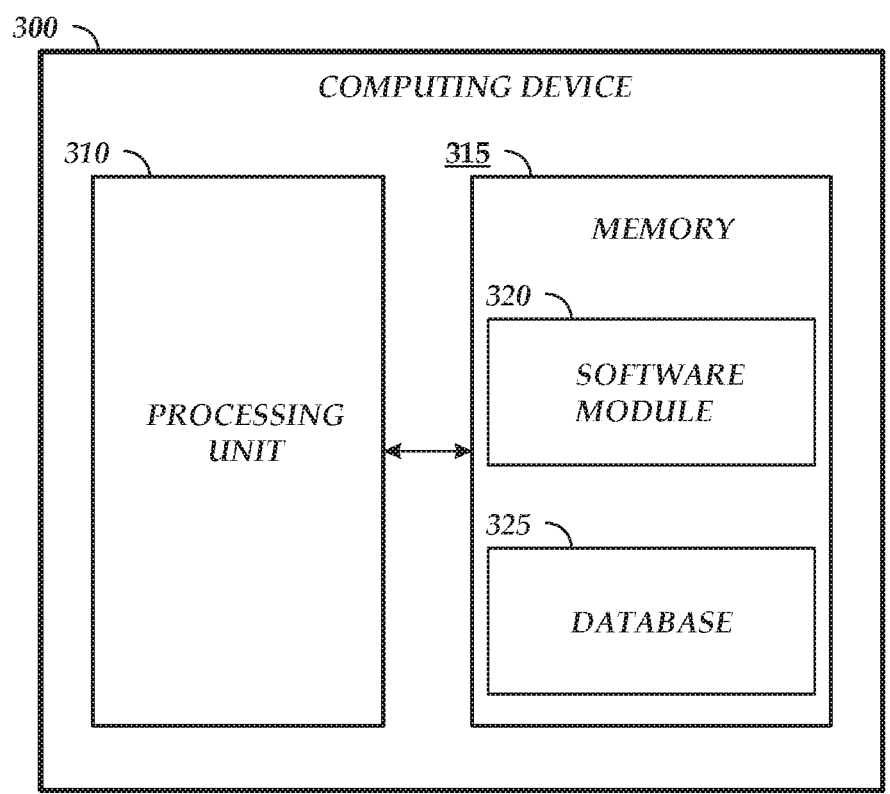
FIG. 3 shows a computing device.

FIG. 3 shows a computing device 300. As shown in FIG. 3, computing device 300 may include a processing unit 310 and a memory unit 315. Memory unit 315 may include a software module 320 and a database 325. While executing on processing unit 310, software module 320 may perform processes for providing underlay overlay correlation in a network, including for example, any one or more of the stages from method 200 described above with respect to FIG. 2. Computing device 300, for example, may provide an operating environment for network management device 106, the network devices of network 102, or any of plurality of client devices 104. Network management device 106, the network devices of network 102, and plurality of client devices 104 may operate in other environments and are not limited to computing device 300.

Computing device 300 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, or other similar microcomputer-based device. Computing device 300 may comprise any computer operating environment, such as hand-held devices, multi-processor systems, microprocessor-based or programmable sender electronic devices, minicomputers, mainframe computers, and the like. Computing device 300 may also be practiced in distributed computing environments where tasks are performed by remote processing devices. Furthermore, computing device 300 may comprise, for example, a mobile terminal, such as a smart phone, a cellular telephone, a cellular telephone utilizing Wireless Application Protocol (WAP) or unlicensed mobile access (UMA), personal digital assistant (PDA), intelligent pager, portable computer, a hand-held computer, a conventional telephone, or a Wireless Fidelity (Wi-Fi) access point. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
receiving, by a first network device in a network, a flow having source information corresponding to a first client device and destination information corresponding to a second client device;
creating, by the first network device, a tag for the flow based upon the source information and the destination information, wherein creating the tag comprises creating a hash of the source information comprising a source address corresponding to the first client device and a source port identifier corresponding to the first client device and destination information comprising a destination address corresponding to the second client device and a destination port identifier corresponding to the second client device;
encapsulating, by the first network device, a packet corresponding to the flow, wherein encapsulating the packet comprises encapsulating the packet with encapsulation information comprising the created tag;
routing the encapsulated packet through a plurality of intermediate network devices in the network, the created tag encapsulated with the packet identifying the packet as being a part of the flow as the packet is routed through the plurality of intermediate network devices;
exporting, by each of the plurality of intermediate network devices to a network management device, a flow entry corresponding to the routed encapsulated packet, the flow entry comprising the tag as source port for the encapsulated packet; and
correlating, by the network management device, the flow from the first network device through the plurality of intermediate network devices based upon the tag, wherein correlating the flow further comprises checking the source port identified by the tag to see that it matches a flow from one of the following: the first network device and the second network device.

2. The method of claim 1, wherein receiving the flow comprises receiving the flow wherein the source information comprises the source address corresponding to the first client device and the source port identifier corresponding to the first client device and wherein the destination information comprises the destination address corresponding to the second client device and the destination port identifier corresponding to the second client device.

3. The method of claim 1, wherein receiving the flow comprises receiving the flow wherein the source information comprises an internet protocol address of the first client device and the source port identifier of a port on the first network device that the first client device is connected and wherein the destination information comprises an internet protocol address of the second client device and the destination port identifier of a port on a second network device that the second client device is connected.

4. The method of claim 1, wherein creating the tag comprises creating the hash based upon the source information and the destination information wherein the source address corresponding to the first client device comprises an internet protocol address of the first client device and the source port identifier of a port on the first network device that the first client device is connected and wherein the destination address corresponding to the second client device comprises an internet protocol address of the second client device and the source port identifier of a port on a second network device that the second client device is connected.

5. The method of claim 1, wherein encapsulating the packet with encapsulation information including the created tag comprises encapsulating the packet wherein the encapsulation information further comprises an address of the first network device, an address of a second network device to which the second client device is connected, and an overlay port identifier.

6. The method of claim 1, wherein encapsulating the packet with encapsulation information including the created tag comprises encapsulating the packet wherein the encapsulation information further comprises an internet protocol address of the first network device, an internet protocol address of a second network device to which the second client device is connected, and an overlay port identifier.

7. A method comprising:
receiving, by a first network device in a network, a flow having source information corresponding to a first client device and destination information corresponding to a second client device;
creating, by the first network device, a tag for the flow based upon the source information and the destination information, wherein creating the tag comprises creating a hash based upon the source information and the destination information, wherein the source information comprises an internet protocol address of the first client device and a source port identifier of a port on the first network device that the first client device is connected and wherein the destination information comprises an internet protocol address of the second client device and a source port identifier of a port on a second network device that the second client device is connected;
encapsulating, by the first network device, a packet corresponding to the flow, wherein encapsulating the packet comprises encapsulating the packet with encapsulation information including the created tag;
exporting, by each of the plurality of intermediate network devices to a network management device, a flow entry corresponding to a routed encapsulated packet, the flow entry including the tag; and
correlating, by the network management device, the flow from the first network device through the plurality of intermediate network devices based upon the tag wherein correlating the flow further comprises checking a source port identified by the tag to see that it matches a flow from one of the following: the first network device and the second network device.

8. The method of claim 7, further comprising routing the encapsulated packet through a plurality of intermediate network devices in the network, the created tag encapsulated with the packet identifying the packet as being a part of the flow as the packet is routed through the plurality of intermediate network devices.

9. The method of claim 7, wherein encapsulating the packet with encapsulation information including the created tag comprises encapsulating the packet wherein the encapsulation information further comprises an address of the first network device, an address of a second network device to which the second client device is connected, and an overlay port identifier.

10. The method of claim 7, wherein encapsulating the packet with encapsulation information including the created tag comprises encapsulating the packet wherein the encapsulation information further comprises an internet protocol address of the first network device, an internet protocol address of a second network device to which the second client device is connected, and an overlay port identifier.

11. An apparatus comprising:
a memory storage; and
a processing unit coupled to the memory storage, wherein the processing unit is operative to:
receive a flow having source information corresponding to a first client device and destination information corresponding to a second client device;
create a tag for the flow based upon the source information and the destination information, wherein the processing unit being operative to create the tag comprises the processing unit being operative to create a hash based upon the source information and the destination information wherein the source information comprises a source address corresponding to the first client device and a source port identifier corresponding to the first client device and wherein the destination information comprises a destination address corresponding to the second client device and a destination port identifier corresponding to the second client device;
encapsulate a packet corresponding to the flow, wherein encapsulating the packet comprises encapsulating the packet with encapsulation information including the created tag;
export a flow entry corresponding to a routed encapsulated packet, the flow entry including the tag; and
correlate the flow from the first network device through the plurality of intermediate network devices based upon the tag wherein the processing unit being operative to correlate the flow comprises the processing unit being operative to check a source port identified by the tag to see that it matches a flow from one of the following: the first network device and the second network device.

12. The apparatus of claim 11, wherein the processing unit is further operative to route the encapsulated packet to a one of a plurality of intermediate network devices in a network, the created tag encapsulated with the packet identifying the packet as being a part of the flow.

13. The apparatus of claim 11, wherein the processing unit being operative to create the tag comprises the processing unit being operative to create the hash based upon the source information and the destination information wherein the source address corresponding to the first client device comprises an internet protocol address of the first client device and a source port identifier of a port on the first network device that the first client device is connected and wherein the destination address corresponding to the second client device comprises an internet protocol address of the second client device and a source port identifier of a port on a second network device that the second client device is connected.

14. The apparatus of claim 11, wherein the processing unit being operative to encapsulate the packet with encapsulation information including the created tag comprises the processing unit being operative to encapsulate the packet wherein the encapsulation information further comprises an address of the first network device, an address of a second network device to which the second client device is connected, and an overlay port identifier.

15. The apparatus of claim 11, wherein the processing unit being operative to encapsulate the packet with encapsulation information including the created tag comprises the processing unit being operative to encapsulate the packet wherein the encapsulation information further comprises an internet protocol address of the first network device, an internet protocol address of a second network device to which the second client device is connected, and an overlay port identifier.

\* \* \* \* \*